United States Patent
Yang et al.

(10) Patent No.: US 12,280,356 B2
(45) Date of Patent: Apr. 22, 2025

(54) ZINC ALUMINUM SILICATE/GRANULAR RED MUD COMPOSITE MATERIAL OF $Zn^{2+}$-MODIFIED INDUSTRIAL WASTE RED MUD, PREPARATION METHOD AND APPLICATION THEREOF

(71) Applicant: SHAANXI UNIVERSITY OF SCIENCE & TECHNOLOGY, Xi'an (CN)

(72) Inventors: Yanling Yang, Xi'an (CN); Jingeng Chen, Xi'an (CN); Zhigang Chen, Xi'an (CN); Yu Sun, Xi'an (CN); Yuefeng Chen, Xi'an (CN); Zhao Luo, Xi'an (CN); Chenguang Zhang, Xi'an (CN); Tiandong Wu, Xi'an (CN); Xuefeng Tian, Xi'an (CN); Huajun Chen, Xi'an (CN)

(73) Assignee: SHAANXI UNIVERSITY OF SCIENCE & TECHNOLOGY, Xi'an (CN)

( * ) Notice: Subject to any disclaimer, the term of this patent is extended or adjusted under 35 U.S.C. 154(b) by 0 days.

(21) Appl. No.: 18/638,003

(22) Filed: Apr. 17, 2024

(65) Prior Publication Data
US 2024/0367144 A1 Nov. 7, 2024

(30) Foreign Application Priority Data
May 5, 2023 (CN) .......................... 202310501591.X

(51) Int. Cl.
 *B01J 20/16* (2006.01)
 *B01J 20/28* (2006.01)
 *B01J 20/30* (2006.01)

(52) U.S. Cl.
 CPC ......... *B01J 20/16* (2013.01); *B01J 20/28004* (2013.01); *B01J 20/2803* (2013.01);
 (Continued)

(58) Field of Classification Search
 CPC .. B01J 20/16; B01J 20/28004; B01J 20/2803; B01J 20/3028; B01J 20/3042; B01J 20/3064; B01J 20/3078; B01J 20/3085
 See application file for complete search history.

(56) References Cited

FOREIGN PATENT DOCUMENTS

| CN | 1204301 A | 1/1999 |
|---|---|---|
| CN | 101559353 A | 10/2009 |

(Continued)

OTHER PUBLICATIONS

Machine translation of CN-113634222-A (Year: 2021).*

(Continued)

*Primary Examiner* — Samir Shah
*Assistant Examiner* — Logan Edward Laclair
(74) *Attorney, Agent, or Firm* — Pilloff Passino & Cosenza LLP; Rachel Pilloff; Sean Passino

(57) ABSTRACT

A zinc aluminium silicate nanoparticles/granular red mud (ZAS/GRM) composite material of $Zn^{2+}$-modified industrial waste red mud and a preparation method and application thereof are disclosed, belonging to the technical field of adsorbent preparation. The industrial waste red mud is used as a raw material to prepare $Zn^{2+}$-modified red mud for ZAS/GRM adsorbent.

7 Claims, 10 Drawing Sheets

(52) U.S. Cl.
CPC ....... *B01J 20/3028* (2013.01); *B01J 20/3042* (2013.01); *B01J 20/3064* (2013.01); *B01J 20/3078* (2013.01); *B01J 20/3085* (2013.01)

(56) References Cited

FOREIGN PATENT DOCUMENTS

| | | | |
|---|---|---|---|
| CN | 102886247 A | | 1/2013 |
| CN | 104888686 A | | 9/2015 |
| CN | 113634222 A | * | 11/2021 |
| CN | 113830972 A | | 12/2021 |
| CN | 115155516 A | | 10/2022 |
| CN | 115155516 B | * | 11/2022 |
| KR | 20170019502 A | | 2/2017 |

OTHER PUBLICATIONS

Machine translation of CN-115155516-B (Year: 2022).*
An et al (A strategy-purifying wastewater with waste materials: Zn2+ modified waste red mud as recoverable adsorbents with an enhanced removal capacity of congo red, Journal of Colloid and Interface Science, 2023). (Year: 2023).*
Notification to Grant Patent Right for Invention for China Application No. 202310501591.X, dated Jan. 18, 2024.
First Search Report for China Application No. 202310501591.X, dated Jan. 9, 2024.

* cited by examiner

ZINC ALUMINUM SILICATE/GRANULAR RED MUD COMPOSITE MATERIAL OF $Zn^{2+}$-MODIFIED INDUSTRIAL WASTE RED MUD, PREPARATION METHOD AND APPLICATION THEREOF

CROSS-REFERENCE TO RELATED APPLICATIONS

This disclosure claims priority to Chinese Patent Application No. 202310501591.X, filed on May 5, 2023, the contents of which are hereby incorporated by reference.

TECHNICAL FIELD

The present disclosure belongs to the technical field of adsorbent preparation, and particularly relates to a zinc aluminum silicate/granular red mud (ZAS/GRM) composite material of $Zn^{2+}$-modified industrial waste red mud, and a preparation method and application thereof.

BACKGROUND

Congo red (CR) is a typical organic dye pollutant with high stability, it is non-degradable and is extremely difficult to be removed from wastewater due to its water solubility and the high stability. Besides, CR has been proved to be toxic and carcinogenic to biological systems such as the respiratory, reproductive, ocular and dermal systems. The detection of CR in water has attracted much public attention, and there is an urgent need to develop a feasible and effective strategy to alleviate the impact of CR on the aquatic environment. To remove CR, adsorption has been proved to be an effective technique, and has been used in a variety of applications with advantages of low cost and convenient processing. Typically, there are three main types of adsorption methods, including physical adsorption, chemical adsorption, and electrostatic interaction adsorption. Moreover, it is critical to select the right type of adsorbent for removing CR effectively.

Red mud (RM) is a solid waste generated during the production of alumina. It is often considered a hazardous pollutant due to its strong alkalinity and the presence of a range of harmful heavy metal elements. According to statistics, each tonne of alumina production inevitably leads to the emission of 1 to 2 tonnes of RM. As a large alumina producing country, China produces about 50 million tonnes of RM per year, and the total stockpile of RM in China is now as high as 500 million tonnes. Usually, alumina plants mostly transport RM to the dumps and store it in the form of open dams. However, owing to the undesirable characteristics of RM such as strong alkaline and heavy metal content, large-scale stockpiling of RM causes serious contamination of soil and groundwater resources in the neighbouring areas. Therefore, reducing the pollution of RM to the environment as well as realizing the resourceful use of RM are important technical challenges.

The original RM is powdery, with an average particle size of about 3-10 micrometers (m) and a large specific surface area, which may be used as a material for dye adsorption. However, original powdery RM is limited in its capacity to adsorb pollutants if it is directly used for adsorption, and the adsorption process involves the leaching of heavy metal elements, resulting in secondary pollution of the water body. Besides, the original powdery RM is not easily recycled and reclaimed, and is more costly and less reproducible for large-scale applications. Currently, powdery RM "granulation" has become the trend of RM research development, involving adding bentonite, fly ash, starch, sodium carbonate, sodium silicate and other substances to RM to prepare RM into large granular red mud (GRM) which is more favourable for practical production and industrial application.

As a dye adsorbent, GRM has good adsorption capacity in terms of CR, as well as the potential of improving the adsorption capacity by modifying the surface activity of GRM. The adsorption capacity of GRM may also be improved by physical and chemical modification methods. Compared with physical modification, chemical modification allows the surface chemistry of GRMs to be directly modified through the introduction of specific functional groups or surfactants, thereby improving the surface properties and adsorption capacity of GRMs. Also, the introduction of appropriate functional groups or surfactants by chemical modification enables selective enhancement of the interaction between the GRM and adsorbed molecules, thereby improving the stability and service life of the GRM. As a chemical modification method, the ion exchange method has been proved to be an effective modification technique, where the surface charge of GRM is significantly increased by substituting the ionic groups on the surface of GRM, which enhances the adsorption capacity between GRM and organic dyes. Moreover, the ion-exchange method allows for the modification of the pore size and porosity of GRMs so as to increase their specific surface area and adsorption efficiency. Therefore, the suitable ionic groups for surface ion exchange with GRM are critical to improve its adsorption performance.

Zinc salts have been selected as a suitable material for surface ion exchange with GRM mainly because of the following advantages: firstly, as a chemical widely found in nature, zinc salts are a cost-effective option for large-scale applications; secondly, ion-exchange of zinc salts increases the surface charge of GRM, thus improving the ability thereof to adsorb organic dyes; and thirdly, by adjusting the concentration of zinc salt solution, the selective adsorption of specific pollutants by GRM is realized. Zinc aluminium silicate (ZAS) nanomaterials, a typical material in zinc salts, have a crystal structure in which each silicon oxide tetrahedron and adjacent alumina hexahedron share an oxygen atom to form a T-O-T structure (where T denotes a silicon oxide tetrahedron or an alumina hexahedron), and a stable three-dimensional zinc-aluminium silicate network structure is then formed based on this structure and the zinc ions. However, since ZAS is in a powdery state, it is difficult to remove it after applying it and will cause secondary pollution. Additionally, powdery adsorbents have disadvantages such as easy loss of active ingredients, difficulty in recycling, high cost for large-scale application and poor reproducibility, which significantly limit the application in environmental pollution control.

SUMMARY

In order to overcome the shortcomings of the prior art, the present disclosure aims to provide a zinc aluminum silicate/granular red mud (ZAS/GRM) composite material of $Zn^{2+}$-modified industrial waste red mud, a preparation method and an application thereof, where the $Zn^{2+}$ in ZAS is ion-exchanged with $Na^+$ on the surface of GRM through a simple roasting process, which firmly anchors ZAS on the surface of granular red mud (GRM), and the ZAS/GRM adsorbent with high specific surface area provides a large number of adsorption sites. Besides, the ZAS layer prevents the leakage of heavy metal elements within the GRM. The present application solves technical problems such as the existing powdery red mud-based adsorbent is not easy to be recycled, the cost of large-scale application is high, and the reproducibility is poor, and solves the problem of the secondary pollution of the red mud-based adsorbent to the water body.

In order to achieve the above objectives, the present disclosure adopts the following technical scheme.

The disclosure provides a preparation method of a ZAS/GRM composite material of $Zn^{2+}$-modified industrial waste red mud, including the following steps:

S1, adding red mud, fly ash, a binder and a pore-forming agent into water for mixing, then carrying out artificial granulation to obtain GRM, and then carrying out air drying and roasting on the GRM to obtain porous GRM particles; and S2, immersing the porous GRM particles into a solution containing $Zn^{2+}$, stirring, filtering and drying to obtain a ZAS/GRM adsorbent, then obtaining a ZAS/GRM composite material of $Zn^{2+}$-modified industrial waste red mud by subjecting the ZAS/GRM adsorbent to roasting treatment.

Optionally, in the S1, a dosage ratio of the red mud, fly ash, binder, pore-forming agent and water is (70-80):(5-10):(5-15):(1-7):(20-200) milliliters (mL).

Optionally, the binder is $C_6H_{12}O_6$; and the pore-forming agent is $NaHCO_3$.

Optionally, in the S1, a particle size of the GRM is 5-10 millimeters (mm); a duration of the air drying is 10-48 hours (h); technological parameters of the roasting are: preheating at 273-973 Kelvin (K) for 0.1-2 h, and baking at 873 K-1773K for 20-90 minutes (min).

Optionally, in the S2, the solution containing $Zn^{2+}$ is a $ZnCl_2$, $ZnSO_4$ or $ZnCO_3$ solution, and a concentration of the solution containing $Zn^{2+}$ is 0.10-0.30 $mol \cdot L^{-1}$.

Optionally, in the S2, a dosage ratio of the porous GRM particles to the solution containing $Zn^{2+}$ is (1.0-15) grams (g):(20-100) mL.

Optionally, in the S2, the stirring is continued for 10 to 48 h at a speed of 200 to 900 revolutions per minute (rpm); and a temperature for the drying is 273-600 K.

Optionally, in the S2, technological parameters of the roasting treatment are: roasting at 600-973 K for 1-5 h.

The present disclosure also provides a ZAS/GRM composite material of $Zn^{2+}$-modified industrial waste red mud prepared by the preparation method illustrated above.

The present disclosure also provides an application of the ZAS/GRM composite material of $Zn^{2+}$-modified industrial waste red mud illustrated above, where the ZAS/GRM composite material of $Zn^{2+}$-modified industrial waste red mud is used as an adsorbent for removing organic pollutants in wastewater.

Optionally, the organic pollutants are Congo red.

Compared with the prior art, the present disclosure has the following beneficial effects.

The present disclosure provides a preparation method of ZAS/GRM (nano zinc aluminum silicate/granular red mud) composite material of $Zn^{2+}$-modified industrial waste red mud, including using economical red mud and the like as raw materials, and using a simple, highly efficient, and mass-producible impregnation and baking process to produce ZAS/GRM adsorbents (nano zinc aluminum silicate/granular red mud) of $Zn^{2+}$-modified industrial waste red mud; the synthesis process is simple and easy to operate; moreover, the outer ZAS layer prevents the leakage of heavy metal elements in GRM effectively, thereby solving the problem of secondary pollution of GRM in the industry, and the ZAS layer is used to enhance the adsorption capacity of ZAS/GRM and to act as a shell to encapsulate the heavy metal elements contained in the GRM, which provides a new way of thinking about "curing waste with waste". The present disclosure not only solves the problem of dyestuff water pollution by using the strategy of "waste for waste", but also realizes the resourceful use of industrial waste red mud.

The present disclosure also provides the application of the ZAS/GRM composite material of $Zn^{2+}$-modified industrial waste red mud for removing Congo red, and the ZAS/GRM adsorbent greatly improves the removal efficiency of organic pollutant Congo red in wastewater.

DETAILED DESCRIPTION OF THE EMBODIMENTS

In order to make those skilled in the art understand the characteristics and effects of the present disclosure, the following is a general description and definition of terms and expressions mentioned in the specification and claims. Unless otherwise specified, all technical and scientific terms used in this disclosure are the ordinary meanings understood by those skilled in the art. In case of conflict, the definitions in this specification shall prevail.

The theories or mechanisms described and disclosed herein, whether right or wrong, should not limit the scope of the present disclosure in any way, that is, the contents of the present disclosure may be implemented without being limited by any particular theory or mechanism.

In this disclosure, all characteristics defined in the form of numerical range or percentage range, such as numerical value, quantity, content and concentration, are only for simplicity and convenience. Accordingly, the description of numerical range or percentage range shall be deemed to have covered and specifically disclosed all possible subranges and individual values within the range (including integers and fractions).

In this disclosure, unless otherwise specified, the words "containing", "including", "comprising", "having" or similar words cover the meanings of "consisting of" and "mainly consisting of". For example, "A contains a" covers the meanings of "A contains a and others" and "A only contains a".

Here, for the sake of brevity, not all possible combinations of various technical features in various implementations or embodiments are described. Therefore, as long as there is no contradiction in the combination of these technical features, each technical feature in each implementation or embodiment may be combined arbitrarily, and all possible combinations should be considered as the scope specified by this specification.

Figure 7:
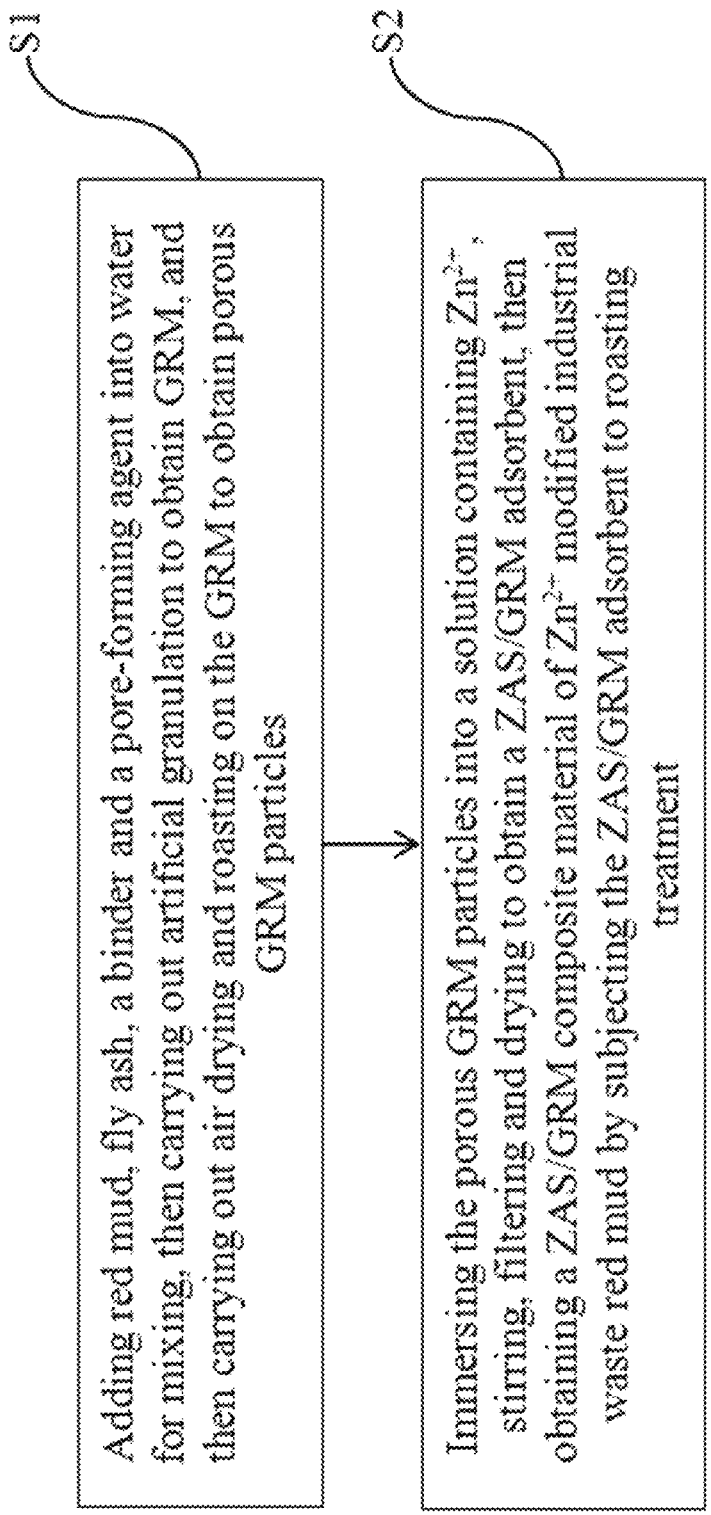
FIG. 7 is a process illustrating the preparation method of ZAS/GRM composite material of $Zn^{2+}$-modified industrial waste red mud.

The disclosure provides a preparation method of a ZAS/GRM composite material of $Zn^{2+}$-modified industrial waste red mud, including the following steps as shown in FIG. 7:

S1, adding red mud, fly ash, a binder and a pore-forming agent into water for mixing, then carrying out artificial granulation to obtain GRM, and then carrying out air drying and roasting on the GRM to obtain porous GRM particles; and S2, immersing the porous GRM particles into a solution containing $Zn^{2+}$, stirring, filtering and drying to obtain a ZAS/GRM adsorbent, then obtaining a ZAS/GRM composite material of $Zn^{2+}$-modified industrial waste red mud by subjecting the ZAS/GRM adsorbent to roasting treatment.

The present disclosure will be further elaborated with specific embodiments. It should be understood that these embodiments are only used to illustrate the disclosure and are not used to limit the scope of the disclosure. In addition, it should be understood that after reading the present disclosure, those skilled in the art may make various changes or modifications to the present disclosure, and these equivalent forms also fall within the scope defined by the appended claims of this disclosure.

Conventional instruments and equipment in the technical field are used in the following embodiments. The experimental methods without specific conditions in the following embodiments usually follow the conventional conditions or the conditions suggested by the manufacturers. Unless otherwise specified, all the raw materials used in the following embodiments are commercially available products, and their specifications are conventional in this technical field. In the specification of the present disclosure and the following embodiments, unless otherwise specified, "%" means weight percentage, "part" means weight part, and a proportion stands for a weight ratio.

Embodiment 1

A preparation method of a zinc aluminum silicate/granular red mud (ZAS/GRM) composite material of $Zn^{2+}$-modified industrial waste red mud, including the following steps:

S1, fully grinding red mud (RM), fly ash (FA), $NaHCO_3$ and $C_6H_{12}O_6$ (binder) as raw materials, screening with a 100-mesh sieve, and then mixing under the mass ratio of RM:FA:$NaHCO_3$:$C_6H_{12}O_6$ of 70:10:10:10 to obtain powder A; subsequently, adding 20 mL deionized water to the obtained powder A to form a mud cake, and obtaining GRM with a particle size of 5 mm by artificial granulation; then, air-drying GRM for 24 h, followed by preheating at 273 K for 0.1 h and baking at 873 K for 20 min, and finally preparing the porous GRM particles; and S2, preparing 20 mL of 0.10 mol·$L^{-1}$ aqueous solution of $ZnCl_2$, then immersing 1 g of porous GRM particles in the aqueous solution of $ZnCl_2$ while continuously stirring at 200 rpm, and after 10 h, filtering and drying at 273 K to obtain the ZAS/GRM adsorbent; before the adsorption experiment, treating the ZAS/CRM adsorbent at 600 K for 1 h to obtain the $Zn^{2+}$-modified industrial waste red mud adsorbent.

Embodiment 2

A preparation method of ZAS/GRM composite material of $Zn^{2+}$-modified industrial waste red mud, including the following steps:

S1, fully grinding red mud (RM), fly ash (FA), $NaHCO_3$ and $C_6H_{12}O_6$ (binder) as raw materials, screening with a 300-mesh sieve, and then mixing under the mass ratio of RM:FA:$NaHCO_3$:$C_6H_{12}O_6$ of 70:10:10:10 to obtain powder A; subsequently, adding 200 mL deionized water to the obtained powder A to form a mud cake, and obtaining GRM with a particle size of 7 mm by artificial granulation; then, air-drying GRM for 10 h, followed by preheating at 573 K for 1.5 h and baking at 973 K for 20 min, and finally preparing the porous GRM particles; and S2, preparing 50 mL of 0.17 mol·$L^{-1}$ aqueous solution of $ZnCl_2$, then immersing 8 g of porous GRM particles in the aqueous solution of $ZnCl_2$ while continuously stirring at 900 rpm, and after 48 h, filtering and drying at 273 K to obtain the ZAS/GRM adsorbent; before the adsorption experiment, treating the ZAS/CRM adsorbent at 600 K for 5 h to obtain the $Zn^{2+}$-modified industrial waste red mud adsorbent.

Embodiment 3

A preparation method of ZAS/GRM composite material of $Zn^{2+}$-modified industrial waste red mud, including the following steps:

S1, fully grinding red mud (RM), fly ash (FA), $NaHCO_3$ and $C_6H_{12}O_6$ (binder) as raw materials, screening with a 100-mesh sieve, and then mixing under the mass ratio of RM:FA:$NaHCO_3$:$C_6H_{12}O_6$ of 75:10:5:10 to obtain powder A; subsequently, adding 100 mL deionized water to the obtained powder A to form a mud cake, and obtaining GRM with a particle size of 6 mm by artificial granulation; then, air-drying GRM for 36 h, followed by preheating at 673 K for 2 h and baking at 1173 K for 60 min, and finally preparing the porous GRM particles; and S2, preparing 80 mL of 0.3 mol·$L^{-1}$ aqueous solution of $ZnCl_2$, then immersing 10 g of porous GRM particles in the aqueous solution of $ZnCl_2$ while continuously stirring at 600 rpm, and after 48 h, filtering and drying at 500 K to obtain the ZAS/GRM adsorbent; before the adsorption experiment, treating the ZAS/CRM adsorbent at 773 K for 2.5 h to obtain the $Zn^{2+}$-modified industrial waste red mud adsorbent.

Embodiment 4

A preparation method of ZAS/GRM composite material of $Zn^{2+}$-modified industrial waste red mud, including the following steps:

S1, fully grinding red mud (RM), fly ash (FA), $NaHCO_3$ and $C_6H_{12}O_6$ (binder) as raw materials, screening with a 100-mesh sieve, and then mixing under the mass ratio of RM:FA:$NaHCO_3$:$C_6H_{12}O_6$ of 75:10:5:10 to obtain powder A; subsequently, adding 100 mL deionized water to the obtained powder A to form a mud cake, and obtaining GRM with a particle size of 7 mm by artificial granulation; then, air-drying GRM for 24 h, followed by preheating at 773 K for 0.5 h and baking at 1173 K for 20 min, and finally preparing the porous GRM particles; and S2, preparing 150 mL of 0.15 mol·$L^{-1}$ aqueous solution of $ZnCl_2$, then immersing 12 g of porous GRM particles in the aqueous solution of $ZnCl_2$ while continuously stirring at 300 rpm, and after 24 h, filtering and drying at 333 K to obtain the ZAS/GRM adsorbent; before the adsorption experiment, treating the ZAS/CRM adsorbent at 773 K for 3 h to obtain the $Zn^{2+}$-modified industrial waste red mud adsorbent.

Embodiment 5

A preparation method of ZAS/GRM composite material of $Zn^{2+}$-modified industrial waste red mud, including the following steps:

S1, fully grinding red mud (RM), fly ash (FA), $NaHCO_3$ and $C_6H_{12}O_6$ (binder) as raw materials, screening with a 100-mesh sieve, and then mixing under the mass ratio of RM:FA:$NaHCO_3$:$C_6H_{12}O_6$ of 75:10:5:10 to obtain powder A; subsequently, adding 150 mL deionized water to the obtained powder A to form a mud cake, and obtaining GRM with a particle size of 7 mm by artificial granulation; then, air-drying GRM for 42 h, followed by preheating at 773 K for 1.5 h and baking at 1073 K for 50 min, and finally preparing the porous GRM particles; and S2, preparing 160 mL of 0.25 mol·$L^{-1}$ aqueous solution of $ZnCl_2$, then immersing 13 g of porous GRM particles in the aqueous solution of $ZnCl_2$ while continuously stirring at 800 rpm, and after 48 h, filtering and drying at 600 K to obtain the ZAS/GRM adsorbent; before the adsorption experiment, treating the ZAS/CRM adsorbent at 873 K for 5 h to obtain the $Zn^{2+}$-modified industrial waste red mud adsorbent.

Embodiment 6

A preparation method of ZAS/GRM composite material of $Zn^{2+}$-modified industrial waste red mud, including the following steps:

S1, fully grinding red mud (RM), fly ash (FA), $NaHCO_3$ and $C_6H_{12}O_6$ (binder) as raw materials, screening with a 100-mesh sieve, and then mixing under the mass ratio of RM:FA:$NaHCO_3$:$C_6H_{12}O_6$ of 75:10:5:10 to obtain powder A; subsequently, adding 180 mL deionized water to the obtained powder A to form a mud cake, and obtaining GRM with a particle size of 6 mm by artificial granulation; then, air-drying GRM for 30 h, followed by preheating at 873 K for 1 h and baking at 973 K for 80 min, and finally preparing the porous GRM particles; and S2, preparing 180 mL of 0.15 mol·$L^{-1}$ aqueous solution of $ZnCl_2$, then immersing 14 g of porous GRM particles in the aqueous solution of $ZnCl_2$ while continuously stirring at 750 rpm, and after 40 h, filtering and drying at 573 K to obtain the ZAS/GRM adsorbent; before the adsorption experiment, treating the ZAS/CRM adsorbent at 673 K for 4 h to obtain the $Zn^{2+}$-modified industrial waste red mud adsorbent.

Embodiment 7

A preparation method of ZAS/GRM composite material of $Zn^{2+}$-modified industrial waste red mud, including the following steps:

S1, fully grinding red mud (RM), fly ash (FA), $NaHCO_3$ and $C_6H_{12}O_6$ (binder) as raw materials, screening with a 300-mesh sieve, and then mixing under the mass ratio of RM:FA:$NaHCO_3$:$C_6H_{12}O_6$ of 80:5:5:10 to obtain powder A; subsequently, adding 200 mL deionized water to the obtained powder A to form a mud cake, and obtaining GRM with a particle size of 7 mm by artificial granulation; then, air-drying GRM for 48 h, followed by preheating at 973 K for 2 h and baking at 1773 K for 90 min, and finally preparing the porous GRM particles; and S2, preparing 200 mL of 0.3 mol·$L^{-1}$ aqueous solution of $ZnCl_2$, then immersing 15 g of porous GRM particles in the aqueous solution of $ZnCl_2$ while continuously stirring at 900 rpm, and after 48 h, filtering and drying at 600 K to obtain the ZAS/GRM adsorbent; before the adsorption experiment, treating the ZAS/CRM adsorbent at 973 K for 5 h to obtain the $Zn^{2+}$-modified industrial waste red mud adsorbent.

Figure 1:
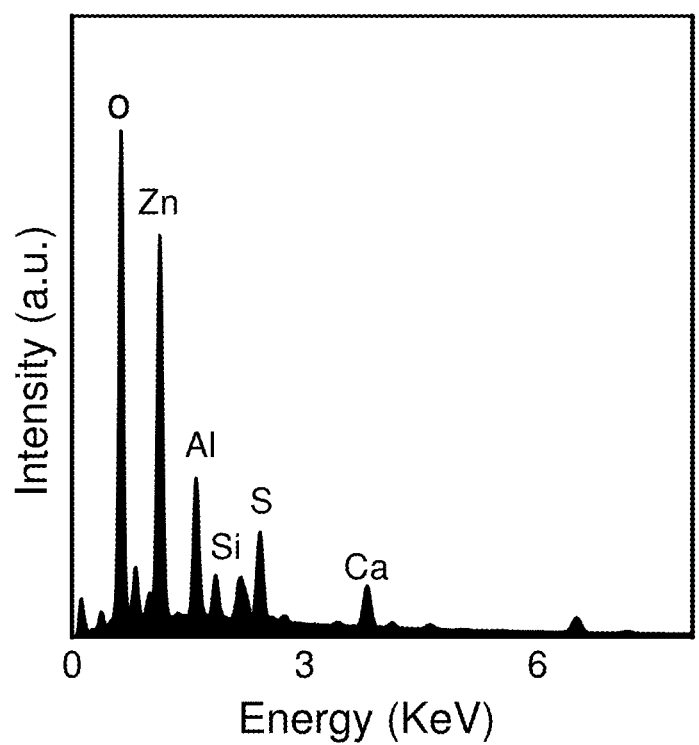
FIG. 1 shows the elemental content of the ZAS/GRM adsorbent.

FIG. 1 shows the elemental content of the ZAS/GRM adsorbent. It can be seen from the FIG. 1 that the content ratios of 27.54%, 7.08%, 2.36%, and 29.86% of Zn, Al, Si, and O, respectively, were distributed on the ZAS/CRM adsorbent.

Figure 2:
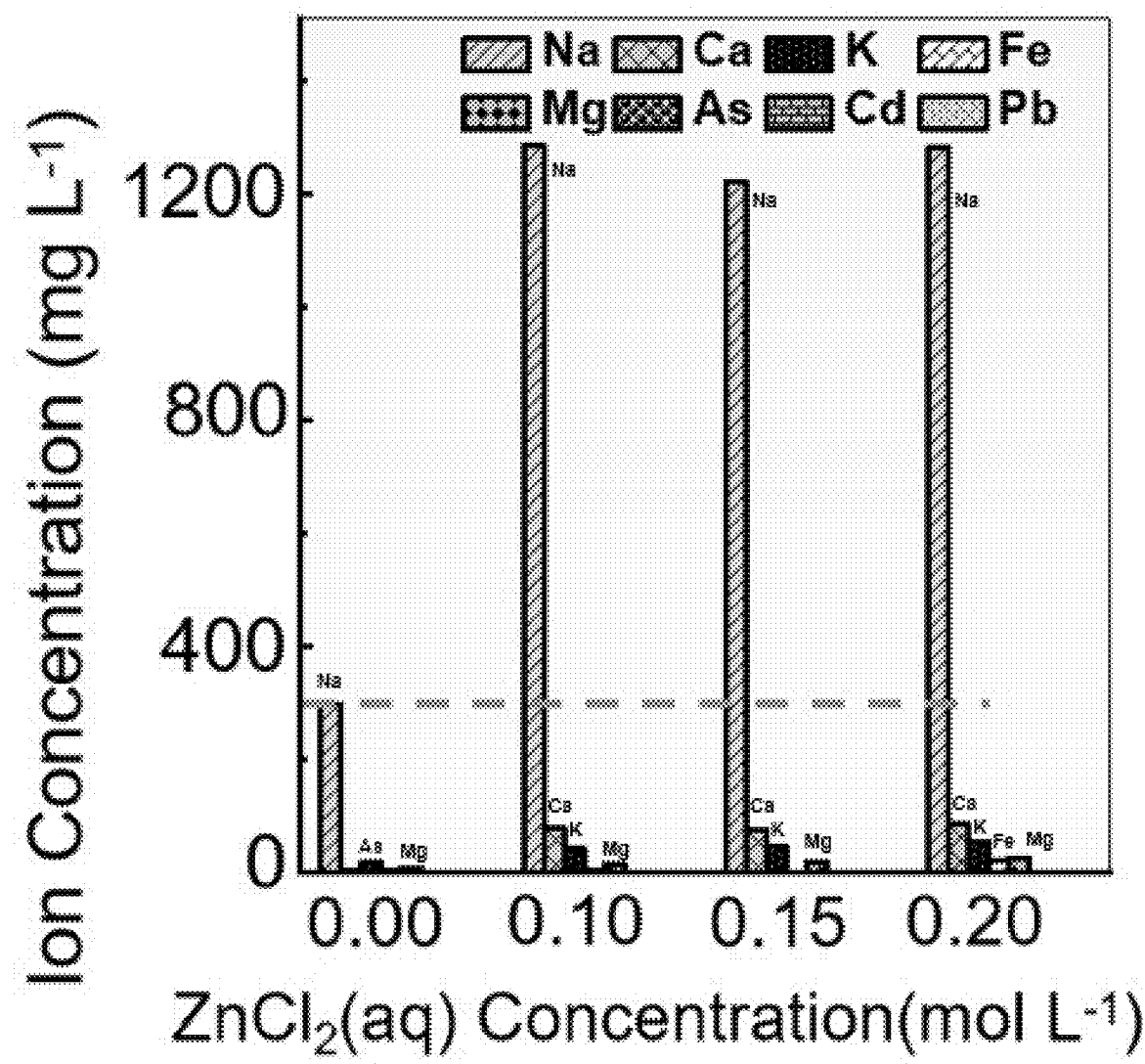
FIG. 2 shows the leaching concentration of heavy metal ions in ZAS/GRM composite in Embodiment 4.

FIG. 2 shows the leaching concentration of heavy metal ions in ZAS/GRM composite in Embodiment 4. From the FIG. 2, it is observed that the concentration of heavy metal elements As, Cd and Pb in the impregnation solution is lower than the wastewater discharge standard. In addition, compared with 0 mol·$L^{-1}$ $ZnCl_2$ (aq), the $Na^+$ content in 0.10, 0.15 and 0.20 mol·$L^{-1}$ $ZnCl_2$ are sharply increased, indicating that there is ion exchange between $Zn^{2+}$ of $ZnCl_2$ and $Na^+$ of GRM.

Figure 3A:
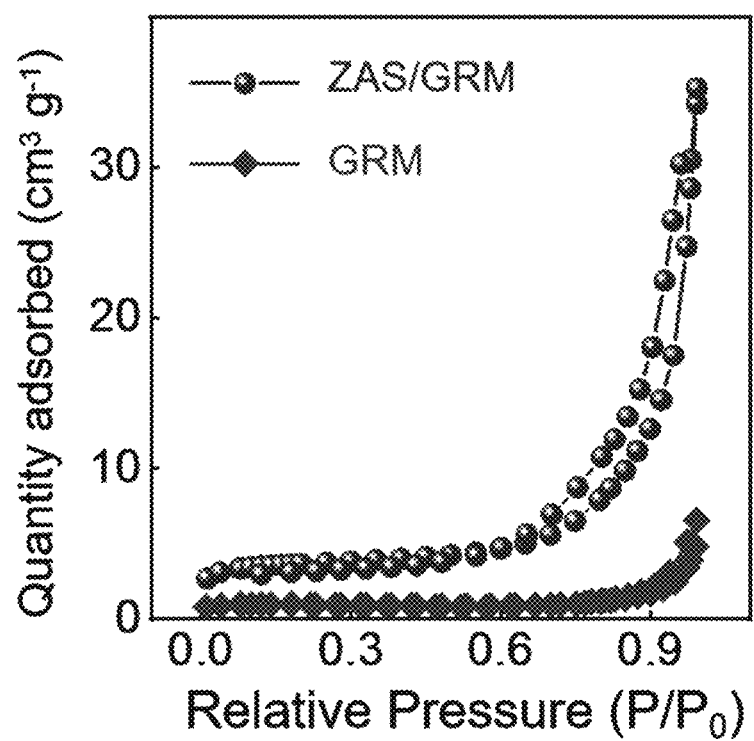
FIG. 3A shows the $N_2$ adsorption-desorption isotherms of porous GRM particles and ZAS/GRM adsorbent in Embodiment 4.
Figure 3B:
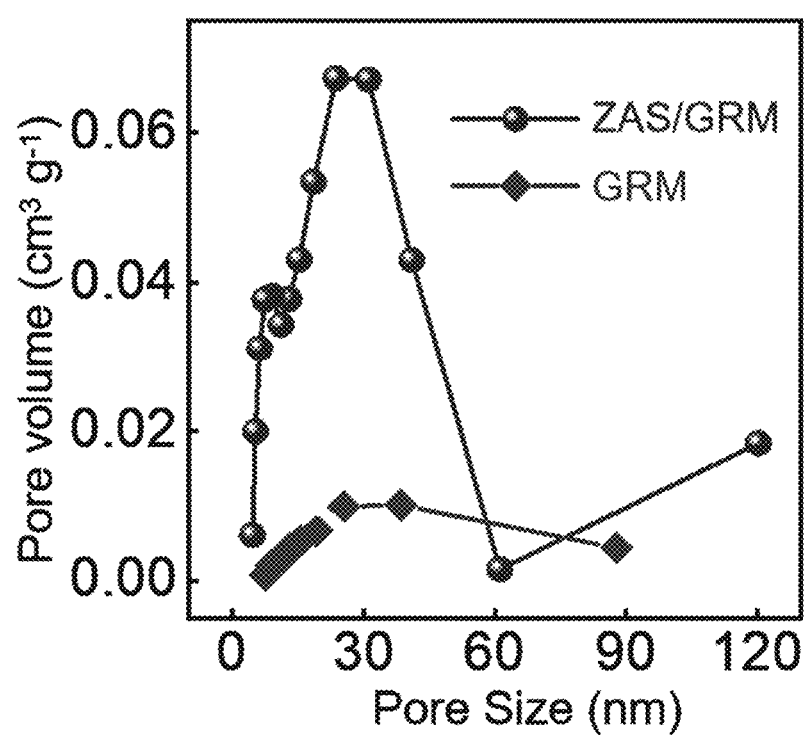
FIG. 3B shows the pore size distribution curves of porous GRM particles and ZAS/GRM adsorbent in Embodiment 4.

FIG. 3A-FIG. 3B show the $N_2$ adsorption-desorption curves of different materials, with obvious H3 hysteresis loops, indicating that GRM and ZAS/GRM adsorbents have mesoporous properties. After $Zn^{2+}$ modification, the specific surface area of porous ZAS/GRM adsorbent are increased from 2.8911 $m_2·g^{-1}$ to 12.0333 $m_2·g^{-1}$. The ZAS/GRM adsorbent with a 6-fold increase in specific surface area provides more active sites for organic pollutants, thus greatly improving its adsorption behavior. FIG. 3B shows further characterized mesoporous distribution of GRM and ZAS/GRM adsorbents. The average pore size of ZAS/GRM adsorbent is 25.412 nm, while that of GRM adsorbent is 41.918 nm. The decrease of pore size is attributed to the loading of ZAS nanoparticles on GRM surface.

Figure 4:
FIG. 4 illustrates a color comparison of ZAS/GRM composite before and after CR adsorption in Embodiment 4.

FIG. 4 shows the color comparison of ZAS/GRM composite before (a yellow CR solution, which appears relatively dark in the black-white FIG. 4) and after (a clarified solution, presented as a clearer and more transparent appearance in the black-white FIG. 4) absorbing CR in Embodiment 4. From the FIG. 4, it is observed that CR is well absorbed on ZAS/GRM composite, achieving the purification effect.

Figure 5:
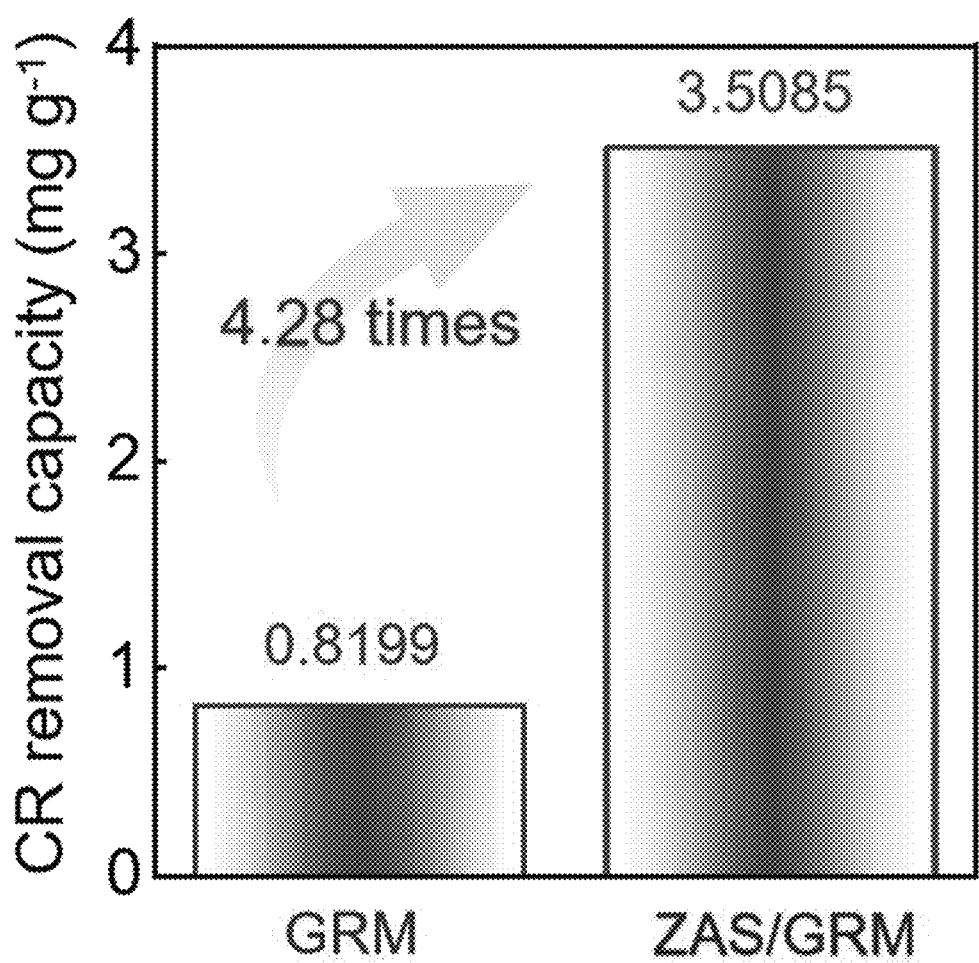
FIG. 5 is a comparison of the effects of porous GRM particles and ZAS/GRM adsorbent on CR removal in Embodiment 4.

FIG. 5 shows a comparison of the effects of porous GRM particles and ZAS/GRM adsorbent on CR removal in Embodiment 4. From the FIG. 5, it may be seen that ZAS/GRM adsorbent achieves efficient solid-liquid separation, thus significantly reducing the loss of adsorbent quality and secondary pollution to the environment during the separation process.

Figure 6A:
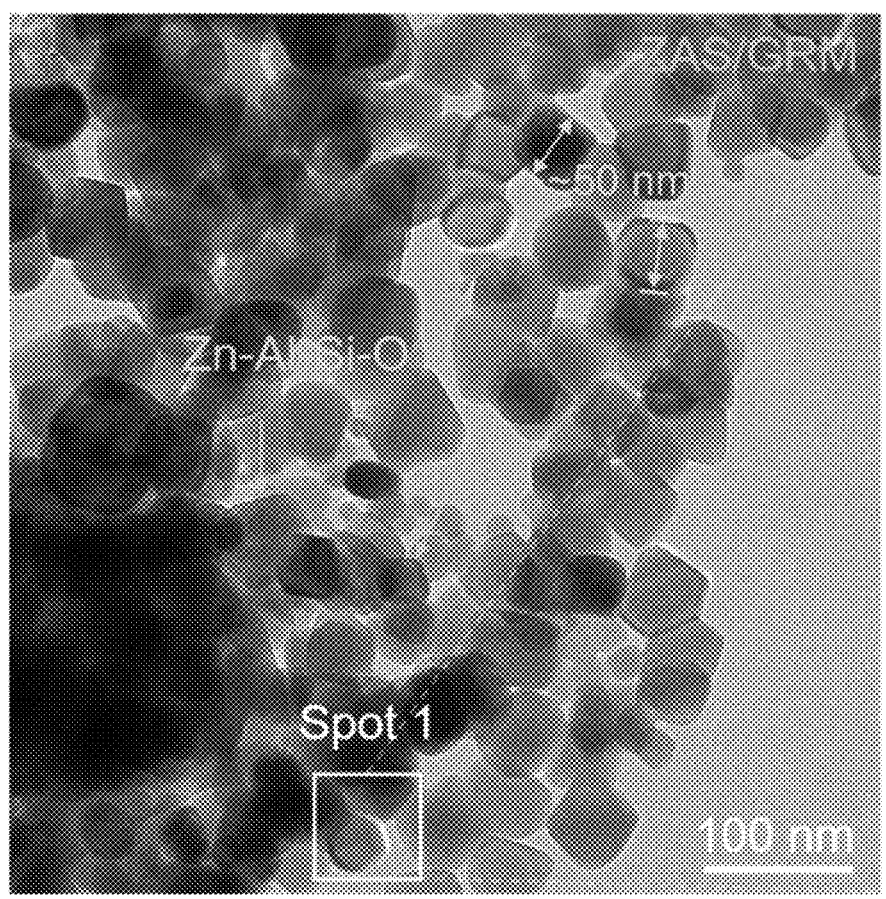
FIG. 6A is a Transmission Electron Microscope (TEM) image of ZAS/GRM adsorbent in Embodiment 4.
Figure 6B:
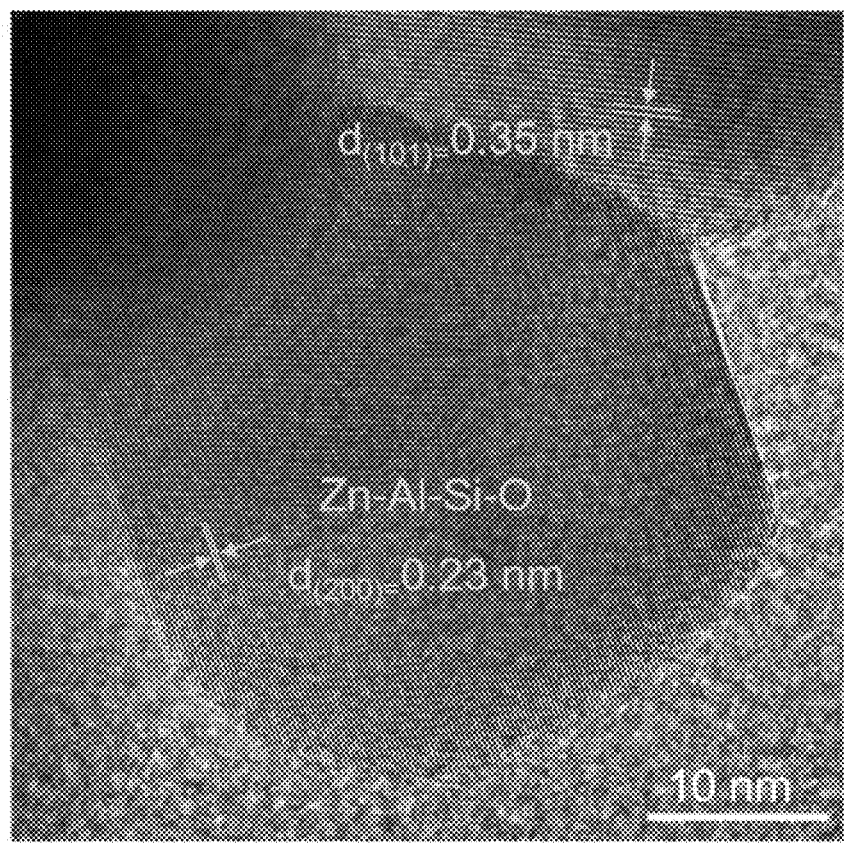
FIG. 6B shows the high resolution TEM image of ZAS/GRM adsorbent in Embodiment 4.
Figure 6C:
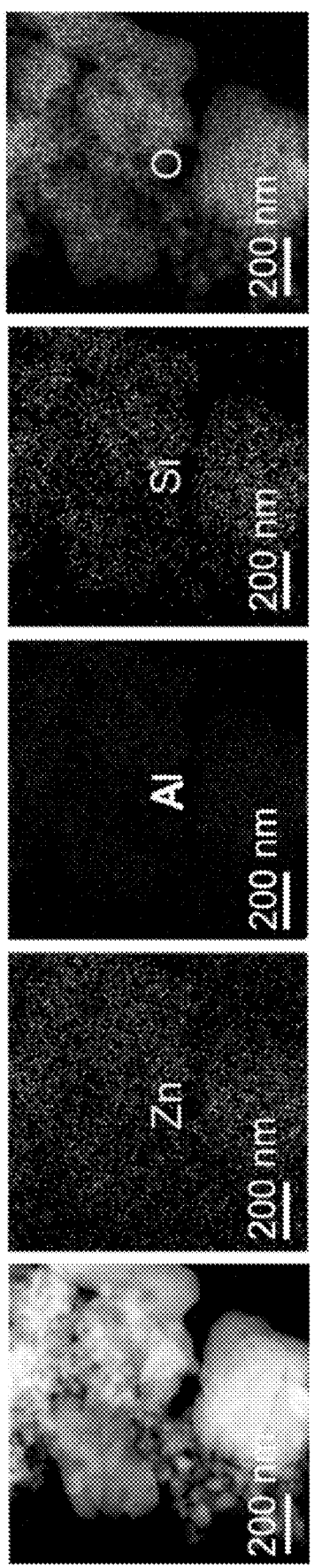
FIG. 6C shows the energy-dispersive spectroscopy (EDS) mapping of ZAS/GRM adsorbent in Embodiment 4.

FIG. 6A-FIG. 6C illustrate the performance characterization diagram of ZAS nanoparticles on the surface of ZAS/GRM adsorbent in Embodiment 4. From FIG. 6A-FIG. 6C, it is observed that ZAS nanoparticles are uniformly distributed on the surface of ZAS/GRM adsorbent, and the analysis results of energy dispersive spectrometer show that Zn, Al, Si and O are uniformly distributed on the surface of ZAS/GRM adsorbent, which indicates that Zn—Al—Si—O material is successfully generated on the surface of GRM.

The above contents are only for explaining the technical idea of the present disclosure, and may not be used to limit the protection scope of the present disclosure. Any changes made on the basis of the technical scheme according to the technical idea proposed by the present disclosure shall fall within the protection scope defined by the claims of the present disclosure.

What is claimed is:

1. A preparation method of a ZAS/GRM composite material of $Zn^{2+}$-modified industrial waste red mud, comprising following steps:
    S1, adding red mud, fly ash, a binder and a pore-forming agent into water for mixing, then carrying out granulation to obtain GRM, and then carrying out air drying and roasting on the GRM to obtain porous GRM particles; and
    S2, immersing the porous GRM particles into a solution containing $Zn^{2+}$, stirring, filtering and drying to obtain a zinc aluminum silicate/granular red mud adsorbent, a ZAS/GRM adsorbent, then obtaining a ZAS/GRM composite material of $Zn^{2+}$-modified industrial waste red mud by subjecting the ZAS/GRM adsorbent to roasting treatment.

2. The preparation method of the ZAS/GRM composite material of $Zn^{2+}$-modified industrial waste red mud according to claim 1, wherein in the S1, a particle size of the GRM is 5-10 mm; a duration of the air drying is 10-48 h; and technological parameters of the roasting are: preheating at 573-973 K for 0.1-2 h, and baking at 873K-1773K for 20-90 min.

3. The preparation method of the ZAS/GRM composite material of $Zn^{2+}$-modified industrial waste red mud according to claim 1, wherein in the S1, the solution containing $Zn^{2+}$ is a $ZnCl_2$, $ZnSO_4$ or $ZnCO_3$ solution, and a concentration of the solution containing $Zn^{2+}$ is 0.10-0.30 $mol·L^{-1}$.

4. The preparation method of the ZAS/GRM composite material of $Zn^{2+}$-modified industrial waste red mud according to claim 1, wherein in the S2, a dosage ratio of the porous GRM particles to the solution containing $Zn^{2+}$ is (1.0-15) g:(20-100) mL.

5. The preparation method of the ZAS/GRM composite material of $Zn^{2+}$-modified industrial waste red mud according to claim 1, wherein in the S2, the stirring is continued for 10 to 48 h at a speed of 200 to 900 rpm; and a temperature for the drying is 333-600 K.

6. The preparation method of the ZAS/GRM composite material of $Zn^{2+}$-modified industrial waste red mud according to claim 1, wherein in the S2, a technological parameter of the roasting treatment is: roasting at 673-973 K for 1-5 h.

7. A ZAS/GRM composite material of $Zn^{2+}$-modified industrial waste red mud prepared by the preparation method of the ZAS/GRM composite material of $Zn^{2+}$-modified industrial waste red mud according to claim 1.

* * * * *